United States Patent
Okazaki et al.

(10) Patent No.: US 6,728,469 B1
(45) Date of Patent: Apr. 27, 2004

(54) VIDEO SIGNAL REPRODUCTION APPARATUS AND METHOD

(75) Inventors: Toru Okazaki, Tokyo (JP); Kenji Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/271,543

(22) Filed: Mar. 18, 1999

(30) Foreign Application Priority Data

Mar. 20, 1998 (JP) .......................................... 10-072685

(51) Int. Cl.$^7$ ................................................ H04N 5/91
(52) U.S. Cl. .......................................... 386/68; 386/81
(58) Field of Search ........................ 386/6–8, 33, 68, 386/73–77, 81–82, 111–112

(56) References Cited

U.S. PATENT DOCUMENTS

| | | | | |
|---|---|---|---|---|
| 5,675,693 A | * | 10/1997 | Kagoshima ................... | 386/68 |
| 5,754,728 A | * | 5/1998 | Nakajima et al. ........... | 386/110 |
| 5,867,625 A | * | 2/1999 | McLaren ..................... | 386/111 |
| 6,002,834 A | * | 12/1999 | Hirabayashi et al. ....... | 386/126 |
| 6,219,489 B1 | * | 4/2001 | Ohta et al. ................. | 348/333.1 |

* cited by examiner

Primary Examiner—Thai Tran
Assistant Examiner—Polin Chieu
(74) Attorney, Agent, or Firm—Frommer Lawrence & Haug LLP; William S. Frommer; Hans R. Mahr

(57) ABSTRACT

The present invention enables to obtain a video representation with a smooth motion during a fast reproduction of a video signal which has been prediction coded in the time axis direction. A video signal reproduction apparatus 100 includes a controller 11 having a detection block 11$a$, a decision block 11$b$, and mode switching block 11$c$. According to an information from a demultiplexer 5 and a decode information from a video decoder 6, the controller 11 detects a reproduction speed in the detection block 11$a$. The detected reproduction speed is supplied to the decision block 11$b$ where it is compared to a predetermined threshold value so as to select a first fast reproduction mode requiring reproduction of all the reference pictures of the video signal which has been prediction coded or a second fast reproduction mode requiring reproduction of some the reference pictures. According to this decision result, the mode switching block 11$c$ switches between the first and the second rast reproduction modes.

17 Claims, 7 Drawing Sheets

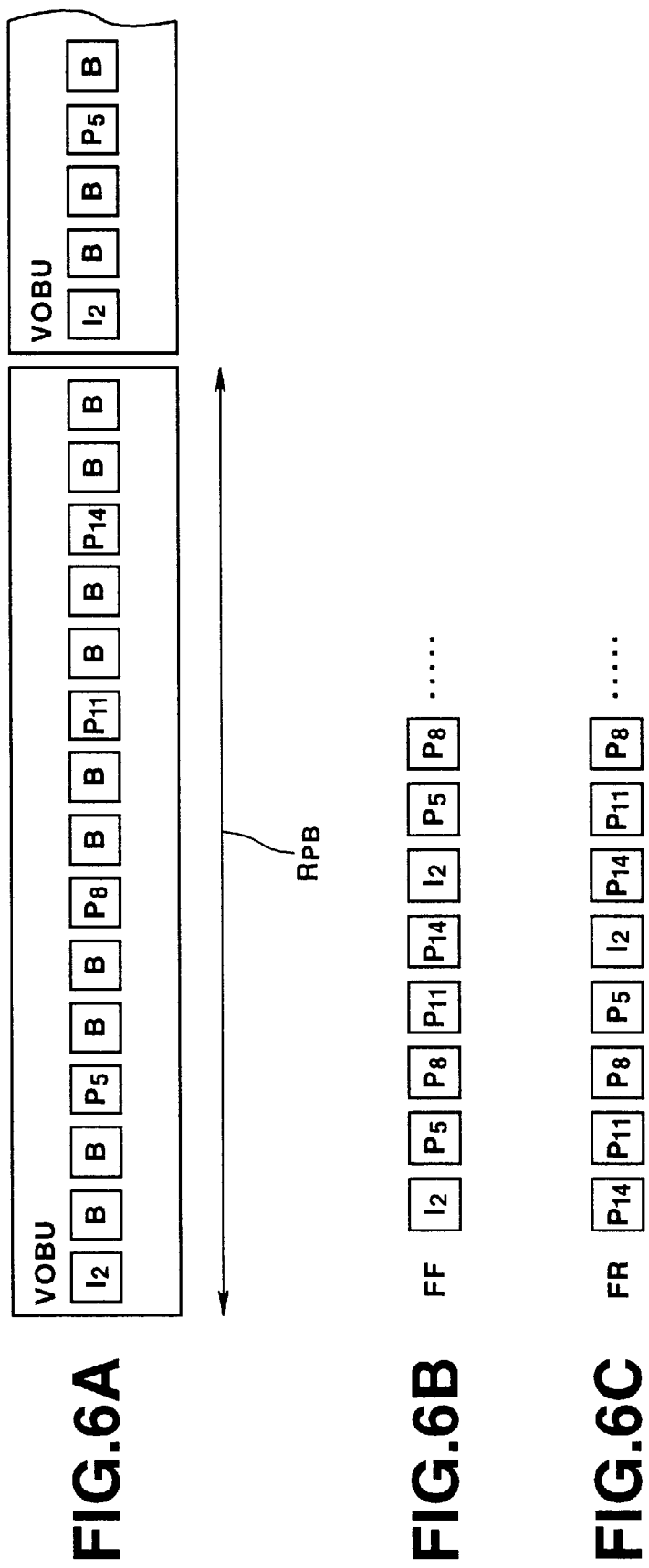

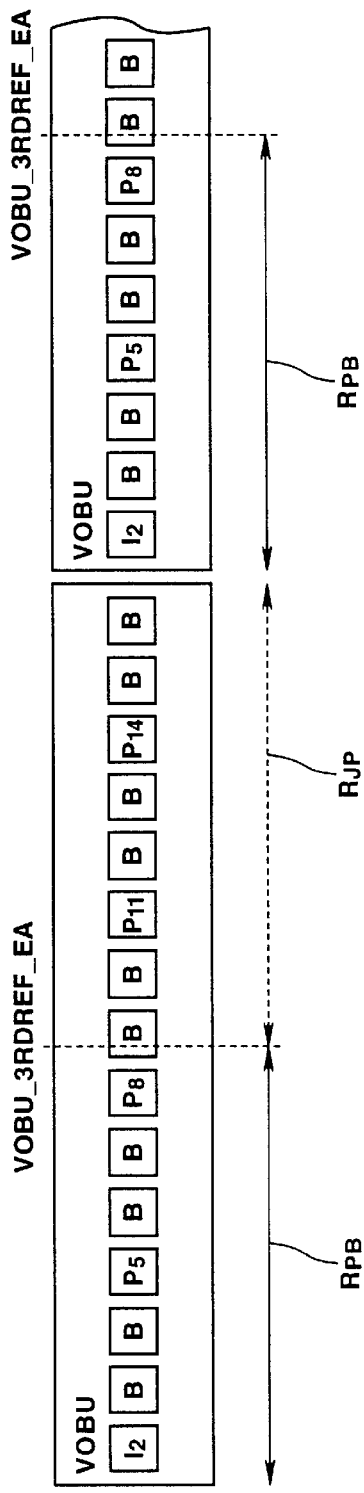

VIDEO SIGNAL REPRODUCTION APPARATUS AND METHOD

BACKGROUND OF THE INVENTION

1. Field of the Invention

The present invention relates to a video signal reproduction apparatus and method for reproducing a video signal which has been prediction-recorded in the time axis direction on a recording medium and in particular, to a video signal reproduction apparatus and method that can preferably be used for high-speed (fast) reproduction of a video signal recorded on a recording medium.

2. Description of the Prior Art

A so-called digital video disc (hereinafter, referred to as DVD) has been known as a recording medium such as an optical disc having a digital video signal and a digital audio signal recorded thereon.

The DVD format uses a cell as a basic unit for reproducing contents of information. The cell consists of smaller reproduction units of 0.4 to 1.2 seconds, which unit is called Video Object Unit (VOBU). This smallest reproduction unit VOBU has at its head a control information pack called a navigation pack, NV_PCK. The NV_PCK contains a presentation control information (PCI) and a data search information (DSI). These information items are used as a VOBU address information for scanning before and after the smallest reproduction unit, VOBU.

FIG. 1 shows a data configuration of the DVD format. As shown in this FIG. 1, a main video data, a sub video data, and an audio data are managed in the video object set (VOBS). The VOBS is, for example, a unit of one movie work. A VOBS consists of a plurality of vide object (VOB). The VOB is a group of data recorded on a disc. Moreover, the VOBS consists of a plurality of Cell. The Cell, for example, corresponds to one scene or one cut of a movie. One Cell lasts several minutes to several tens of minutes. Moreover, the DVD can use a multi-story function which enables to represent one movie in a plurality of stories, or a parental lock function which skips a violence scene or other undesirable scene for education. These functions are created by combination of the Cells.

As has been described above, one Cell consists of a plurality of video object unit (VOBU). This VOBU contains, for example, one GOP (group of pictures) in the MPEG format. It should be noted that the MPEG has been discussed in the ISO-IEC/JTC1/SC2/WG11 and suggested as a standard specification. The MPEG is a hybrid data compression specification using the motion prediction coding and the discrete cosine transform (DCT) coding in combination. The GOP (group of pictures) of the MPEG specification contained in the aforementioned VOBU contains an intra-frame prediction coding picture (I picture), an inter-frame forward direction prediction coding pictures (P picture), and an inter-frame bidirectional prediction coding pictures (B picture). For example, a GOP consisting of 15 frames contains one frame of I picture, four frames of P picture, and ten frames of B picture.

FIG. 2A shows a configuration example of the inter-frame prediction in the MPEG method when a GOP consists of 15 frames.

In FIG. 2A, the I picture is an intra-frame prediction coding picture which has been prediction coded within one frame; the P picture is an inter-frame forward prediction coding picture which performs prediction by referencing a temporally preceding frame (I picture or P picture); and the B picture is a bidirectional prediction coding picture which performs prediction by referencing temporally preceding and following frames.

That is, as indicated by arrows, the I picture $I_2$ is prediction coded within that frame; the P picture $P_5$ is prediction coded by referencing the I picture $I_2$; the Picture $P_8$ is prediction coded by referencing the P picture $P_5$. Furthermore; B pictures $B_3$ and $B_4$ are inter-frame prediction coded by referencing two pictures, i.e., the I picture $I_2$ and the P picture $P_5$; the B picture $B_6$ and $B_7$ are inter-frame coded by referencing two P pictures $P_5$ and $P_8$. Similarly, the other pictures are prediction coded and created. It should be noted that each subscribed numeric represents a temporary reference (hereinafter, referred to as TR). This TR picture sequence in the GOP and in a normal video reproduction, the frames are reproduced in this TR sequence.

The pictures thus prediction coded are decoded as follows. An I picture which has been prediction coded within a frame can be decoded with the I picture alone. Decoding of a P picture which has been prediction coded by referencing a temporally preceding I picture or P picture requires the temporally preceding I picture or P picture. Decoding of a B picture which has been prediction coded by referencing temporally preceding and following I pictures or P pictures requires the temporally preceding and following I pictures or P pictures.

To scope with this, the pictures are rearranged as shown in FIG. 2B, so that the pictures required for decoding can be decoded in advance. That is, decoding of B pictures $B_0$, $B_1$ requires an I picture or P picture in the preceding GOP and an I picture $I_2$ in the current GOP. Accordingly, the I picture $I_2$ is arranged before the B pictures $B_0$, $B_1$. Decoding of B pctures $B_3$, $B_4$ requires the I picture $I_2$ and the P picture $P_5$. Accordingly, the P picture $P_5$ is arranged before the B pictures $B_3$, $B_4$. Decoding of the B pictures $B_6$, $B_7$ requires P pictures $P_5$ and $P_8$. Accordingly, the P picture $P_8$ is arranged before the B pictures $B_6$, $B_7$. Decoding of B pictures $B_9$, $B_{10}$ requires P pictures $P_8$, and $P_{11}$. Accordingly, the P picture $P_{11}$ is arranged to precede the B pictures $B_9$, $B_{10}$. Decoding of B pictures $B_{12}$, $B_{13}$ requires P pictures $P_{11}$ and $P_{14}$. Accordingly, P picture $P_{14}$ is arranged to precede the B pictures $B_{12}$, $B_{13}$. Thus, in the MPEG method, the decoding order is different from the presentation order.

For decoding, the aforementioned prediction coding and Huffman coding are used. Moreover, recording is performed with a variable bit rate (variable transfer rate). For example, a scene with a rapid motion or complicated image requires a large data amount, whereas a simple image or an almost still image requires a small data amount. When this fact is taken into consideration, making use of a variable bit rate variable up to a transfer rate of 9.8 Mbps for example, an average bit rate of 3.5 Mbps is sufficient to realize a picture quality which requires the twice higher rate if a fixed rate is used.

Referring back to FIG. 1, one VOBU is constituted by a navigation pack NV_PCK containing a control information containing a VOBU management information; a video pack V_PCK containing a main video; an audio pack A_PCK containing an audio data; and sub picture pack SP_PCK containing a sub video data. The V_PCK, A_PCK, and SP_PCK are respectively compressed by a format such as MEPG2 and recorded on an optical disc as a recording medium.

FIG. 3 shows a configuration of the navigation pack NV_PCK which is a control information pack contained at the head of a VOBU. As shown in this FIG. 3, the NV_PCK contains a pack header and system header which are followed by a PCI (presentation control information) packet and DSI (data search information) packet. The PCI packet and the DSI packet contain a PCI data and a DSI data, respectively.

Furthermore, although not depicted, the DSI data contains DSI_GI which is a DSI general information. This DSI_GI contains end addresses of the reference pictures (I picture and P picture) for each of the pictures of the aforementioned MPEG. More specifically, the DSI_GI contains VOBU_1STREF_EA which is the end address of the first reference picture within the VOBU, VOBU_2NDREF_EA which is the end address of the second reference picture within the VOBU, and VOBU_3RDREF_EA which is the end address of the third reference picture within the VOBU.

When performing a fast reproduction, for example, twice faster than the standard reproduction speed, the aforementioned NV_PCK address information can be used to reproduce parts of reference pictures (I picture and P picture) within one GOP of the MPEG specification consisting of a plurality of video packs (V_PCK) in a VOBU. For example, Japanese Patent Application 7-32944 (Specification and Drawings) filed by the applicant of the present invention discloses a technique for fast reproduction by reproducing one I picture and two P pictures following the I picture within a GOP before proceeding to the next GOP. This corresponds to, in a DVD case, reproduction of three reference pictures having addresses up to the address obtained by the end address VOBU_3RDREF_EA of the third reference picture in the aforementioned NV_PCK.

Here, one video data in a VOBU corresponds to one GOP. If the GOP is constituted by one frame of I picture, four frames of P picture, and ten frames of B picture, among the five reference pictures (I picture and four P pictures), three reference pictures up to the aforementioned address VOBU_3RDREF_EA are reproduced, while the remaining two reference pictures are track-jumped without being reproduced. Such a fast reproduction can realize a certain high speed by performing a track jump but cannot perform reproduction with a smooth motion. Accordingly, when a smooth motion is desired, such a fast reproduction cannot be used.

SUMMARY OF THE INVENTION

It is therefore an object of the present invention to provide a video signal reproduction apparatus and method capable of performing a fast reproduction with a smooth motion.

The video signal reproduction apparatus according to the present invention is for performing a reproduction processing by reading a video signal which has been prediction coded in the time axis direction and recorded on a recording medium, wherein, during a fast reproduction, according to a reproduction state, switching is performed between a plurality of fast reproduction modes requiring reproduction of different numbers of reference pictures from the video signal recorded on the recording medium.

Here, as an example of the switching, a reproduction state is detected, and the detection output is compared to a threshold value so as to identify an appropriate fast reproduction mode, to which the switching is performed. The reproduction state may be, for example, a reproduction speed and a reproduction bit rate.

When the video signal has been coded and recorded on the recording medium with a variable bit rate, as a higher speed is detected, a fast reproduction mode requiring reproduction of a greater number of reference pictures is set in. Alternatively, as a lower bit rate is detected, a fast reproduction mode requiring reproduction of a greater number of reference pictures is set in.

That is, when a high reproduction speed or a low reproduction bit rate is detected, i.e., when a sufficient reproduction capacity is available, a fast reproduction mode using a greater number of reference pictures is selected so as to obtain a fast representation with a smooth motion.

BRIEF DESCRIPTION OF THE DRAWINGS

FIG. 6 explains a first fast reproduction mode in which all the reference pictures are reproduced and displayed.

FIG. 7 explains a second fast reproduction mode in which three reference pictures are reproduced and displayed.

DETAILED DESCRIPTION OF PREFERRED EMBODIMENTS

Hereinafter, description will be directed to preferred embodiments of the present invention with reference to the attached drawings.

Figure 4:
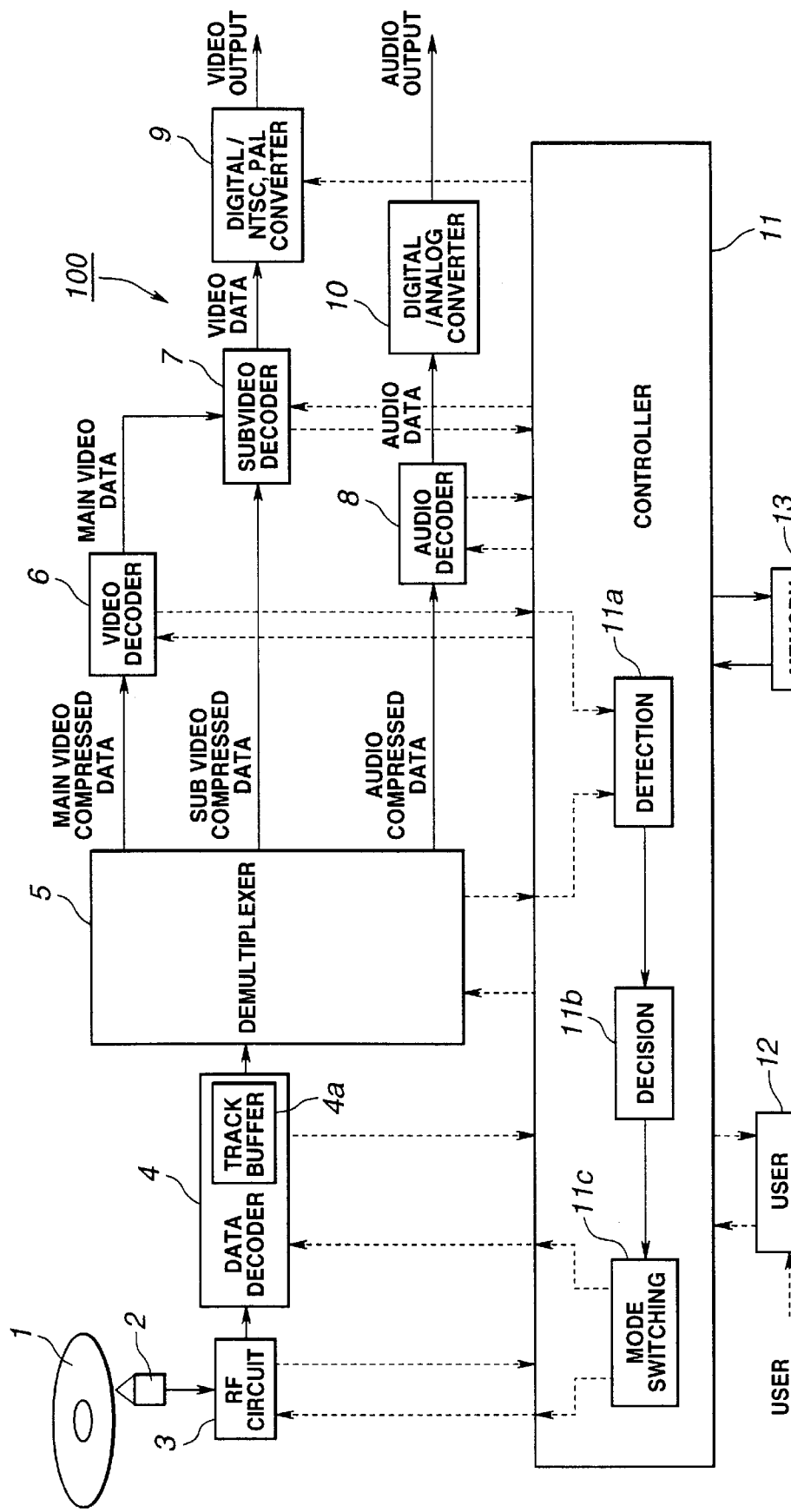
FIG. 4 is block diagram showing a basic configuration of a DVD reproduction apparatus according to an embodiment of the present invention.

FIG. 4 is a block diagram showing a schematic configuration of digital video disc (DVD) reproduction apparatus as a video signal reproduction apparatus according to an embodiment of the present invention.

In this FIG. 4, the DVD reproduction apparatus 100 includes: a pickup 2 for reproducing an RF signal from a recording medium (optical disc) 1; an RF circuit 3 that is supplied with the RF signal reproduced by the pickup 2 and performs digitization of the RF signal; a data decoder 4 that is supplied with the reproduction data from the RF circuit 3 and performs a decode processing such as an error correction; and a demultiplexer 5 for isolating from the reproduction data which has been decoded by the data decoder 4, a main video compressed data, a sub video compressed data, and an audio compressed data.

Moreover, the DVD reproduction apparatus 100 further includes: a video decoder 6 for decompressing the main video compressed data; a sub video decoder 7 for decompressing the sub video compressed data and combining it with the main video data; an audio decoder 8 for decompressing the audio compressed data; a digital/NTSC, PAL conversion circuit (hereinafter, referred to as NTSC conversion circuit) 9 that is supplied with a combined data of the main video data combined with the sub video data from the sub video decoder 7 and converts the combined data into an NTSC signal or PAL signal; and a digital/analog conversion circuit (hereinafter, referred to as D/A conversion circuit) 10 that is supplied with the audio data from the audio decoder 8 and converts the audio data into an analog signal.

Moreover, this DVD reproduction apparatus 100 further includes: a controller 11 for controlling the pickup 2, the RF circuit 3, the data decoder 4, the multiplexer 5, the video decoder 6, the sub video decoder 7, the audio decoder 8, the NTSC conversion circuit 9, and the D/A conversion circuit; a user interface 12 for interfacing between the controller 11 and a user operation input; and a memory 13 serving as a data storage of the controller 11.

The DVD reproduction apparatus 100 reproduces as the recording medium 1, a DVD disc such as a writable and rewritable discs and DVD-VIDEO disc.

The pickup 2 reproduces an RF signal from the recording medium 1 and supplies the RF signal to the RF circuit 3.

The RF circuit 3 performs a waveform equaliztion and digitization of the RF signal to create a digital data and its synchronization signal. The digital data and other data created by this RF circuit are supplied to the data decoder 4.

According to the digital data created by the RF circuit, the data decoder 4 demodulates the data and performs an error correction. The digital data which has been demodulated and error-corrected by the data decoder 4 is supplied to the demultiplexer 5.

Moreover, the data decoder 4 detects a system header in the MPEG2 format, a parameter information contained in the pack header, and other predetermined information contained in the navigation pack (NV_PCK) of the DVD format. The parameter information detected is supplied from the data decoder 4 to the controller Moreover, the data decoder 4 has a track buffer 4a at an output stage of the digial data. This track buffer 4a absorbs a processing speed difference between the data decoder 4 and the demultiplexer 5.

The demultiplexer 5 divides the digital data which has been decoded including an error correction by the data decoder 4, into a main video compressed data, a sub video compressed data, and an audio compressed data.

Here, the main video data is a video data which has been compressed by the MPEG2 method, for example, a video stream in the DVD format. The sub video compressed data is a superimpose data to be combined with the main video data such as Sub-picture streams in the DVD format. The audio compressed data is an audio data which has been compressed by the MPEG2 method and is an audio stream in the DVD format.

The demultiplexer 5 supplies the main video compressed data to the video decoder, the sub video compressed data to the sub video decoder 7, and the audio comopressed data to the audio decoder 8.

The video decoder 6 decodes the main video compressed data and revives a main video data decompressed by this decoding. The video decoder 6 has a memory for three frames for performing this decoding. That is, the aforementioned I picture, P picture, and B picture in the MPEG2 format are decoded and stored in memory of the video decoder 6, and the decoded pictures are output from this memory. This memory may have a capacity greater than three frames. The video decoder 6 supplies the revived main video data to the sub vicdeo decoder 7.

The sub video decoder 7 decodes the sub video compressed data and combines this decoded sub video data with the main video data supplied from the video decoder 6, so as to revive a video data. That is, the sub video decoder 7 combines a main video with a superimpose image and the like to be reproduced as a sub video data. It should be noted that if no sub video data is present, the sub video decoder 7 outputs the main video data as is. The sub video decoder 7 supplies the revived video data to the NTSC conversion circuit 9.

The audio decoder 8 decodes an audio compressed data and revives an audio data decompressed. That is, if the audio compressed data has been compressed by the MPEG2 format, the audio decoder 8 performs a corresponding decompression and revives an audio data. It should be noted that if the audio data has been coded by a format other than the MPEG2 format, such as PCM, a decoding corresponding to the format is performed. The audio decoder 8 supplies the revived audio data to the D/A conversion circuit 10.

The NTSC conversion circuit 9 converts the auido data from a digital data to a television signal of an NTSC or PAL for output. This output is supplied to a monitor or the like so that a user can see and hear the video reproduced from the recording medium 1.

The D/A converter 10 converts the digital audio data into an analog audio data for output. The output is supplied to a loud speaker or the like, so that the user can hear the video data reproduced from the recording medium 1.

The controller 11 controls the pickup 2, the RF circuit 3, the data decoder 4, the demultiplexer 5, the video decoder 6, the sub video decoder 7, the audio decoder 8, the NTSC conversion circuit 9, and the D/A conversion circuit 10. Moreover, the controller 11 is supplied with an operation input via the user interface 12 which is an operation panel or a remote cotroller. According to this operation input, the respective circuits are controlled. Moreover, the controller 11 causes the memory 13 to store a control data and other data and controls the respective circuits according to the data stored in the memory 13.

Moreover, the controller 11 includes: a detection block 11a for detecting a reproduction state such as a reproduction speed at a high speed reproduction such as double speed reproduction; a decision block 11b for comparing the speed detected by the detection block 11a with a predetermined threshold value so as to identify an appropriate fast reproduction mode; and a mode switching block 11c for switching between fast reproduction modes according to the decision result from the decision block 11b.

The present embodiments provides a plurality of fast production modes such as a first fast mode and a second fast mode. The first fast mode is a mode in which a fast reproduction is performed by using all the reference pictures in the video signal recorded in the recording medium 1. The second fast reproduction mode is a mode in which a fast reproduction is performed by using some of the reference pictures. In this case, if the speed detected by the detection block 11a is higher than the predetermined threshold value, the first fast reproduction mode is selected so that a greater number of reference pictures are used.

In the aforementioned detection block 11a, as will be detailed later, the reproduction speed is determined from the NV_PCK (navigation pack) information isolated by the demultiplexer 5 and the decode information in the video decoder 6, and supplies the detected reproduction speed inforamtion to the decision block 11b, so as to decide whether the first or the second fast reproduction mode is appropriate. In order to switch to the first or the second fast mode decided by the decision block, the mode swithcing block 11c performs switching control for access operation in the reproduction mechanism including the RF circuit 3, the pickup head and the spindle motor, and the operation of the data decoder 4.

Figure 5:
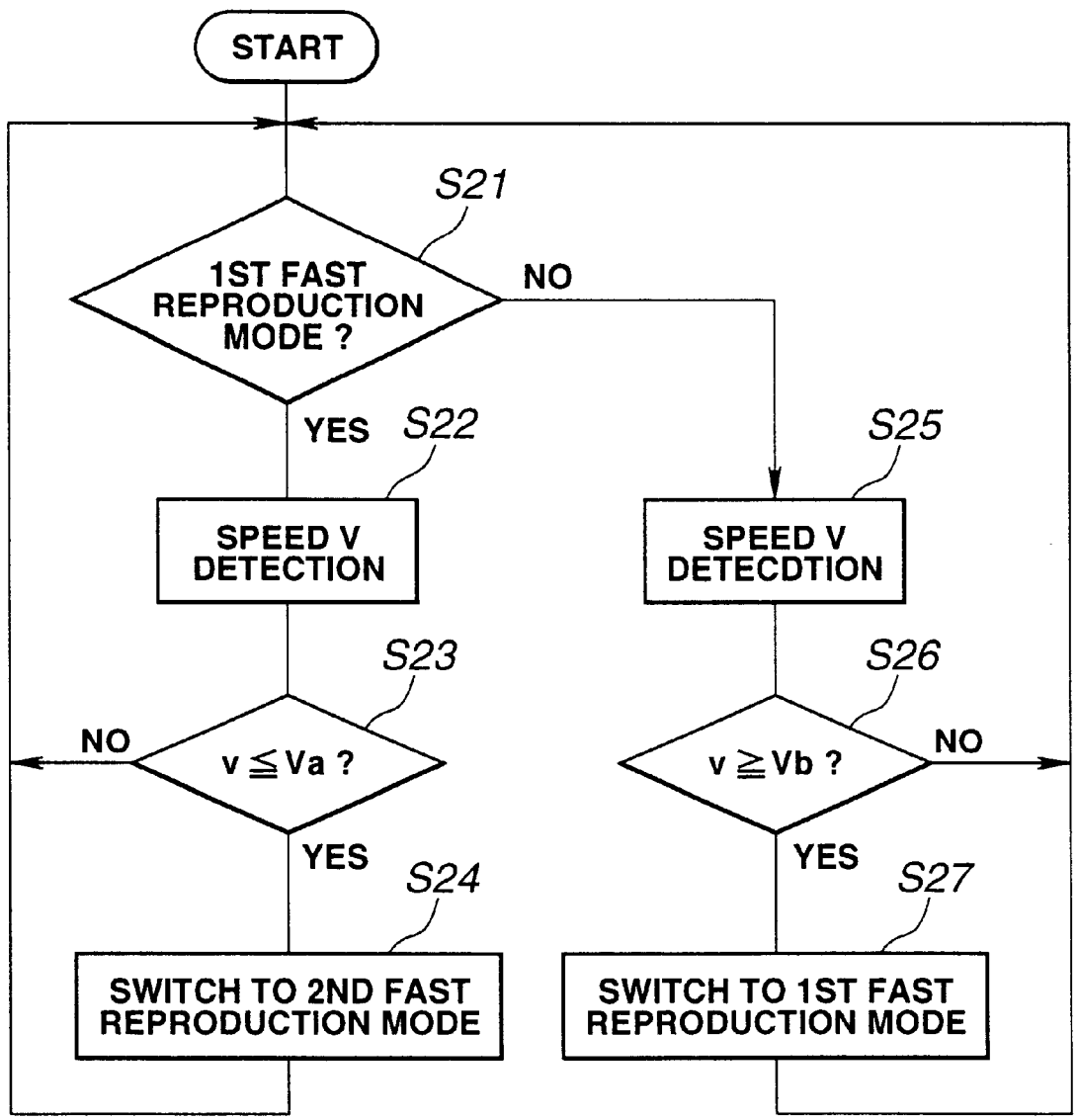
FIG. 5 is a flowchart for explaining switching operations for fast reproduction modes according to a speed detected.

Here, FIG. 5 is a flowchart for explaining the switching control operation for the first and the second fast reproduction modes, in the decision block 11b and the switching block 11c of the controller 11.

In this FIG. 5, for example, when a fast reproduction such as a double-speed reproduction is started, the first step S21 decides whether the current mode is the first fast reproduciton mode. If YES, control is passed to step S22, where the reproduction speed v is determined. The next step S23 decides whether the reproduction speed v determined is equal to or below a first threshold value Va (v≦Va). If YES, the control is passed to step S24, where mode is switched to the second fast reproduction mode requiring reproduction of a smaller number of reference pictures, and the control is returned to step S21. In the case when the decision is NO in step S23, the control is returned directly to step S21.

Moreover, when the decision is NO in step S21, that is, the current mode is the second fast reproduction mode, the reproduction speed v is determined in step S25 and the control is passed to step S26, where it is decided whether the reproduction speed v determined is equal to or above the second threshold value Vb (v≧Vb). The first threshold value and the second threshold vlaue are in the relationship of Va<Vb. If the decision is YES in step S26, that is if the reproduction speed v determined is equal to or above the second threshold value Vb, the control is passed to step S27, where the mode is switched to the first fast reproduction mode requiring a greater number of reference pictures and control is returned to step S21. If the decision in step S26 is NO, the control is returned directly to step S21.

Here, two threshold values, i.e., the first and the second threshold values Va, Vb (Va<Vb) are used because the switchng operation becomes unstable when the reproduction speed fluctuates in the vicinity of a threshold value. It is necessary to prevent a so-called chattering by providing hysterisis in the switcing operation. In principle, this corresponds to switching of the fast reproduction modes above or below a single threshold value.

Figure 2A:
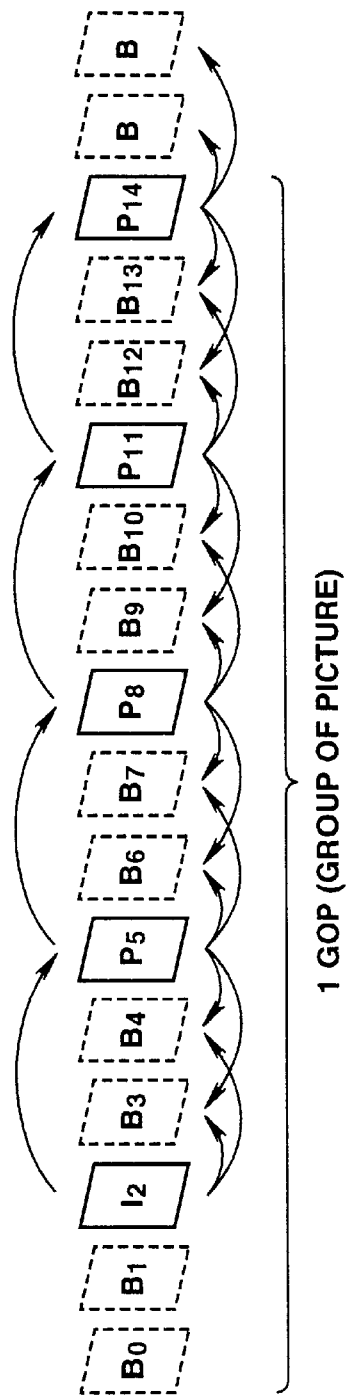
FIG. 2 shows an inter-frame prediction configuration and a recording frame configuration in the MPEG specification.
Figure 2B:
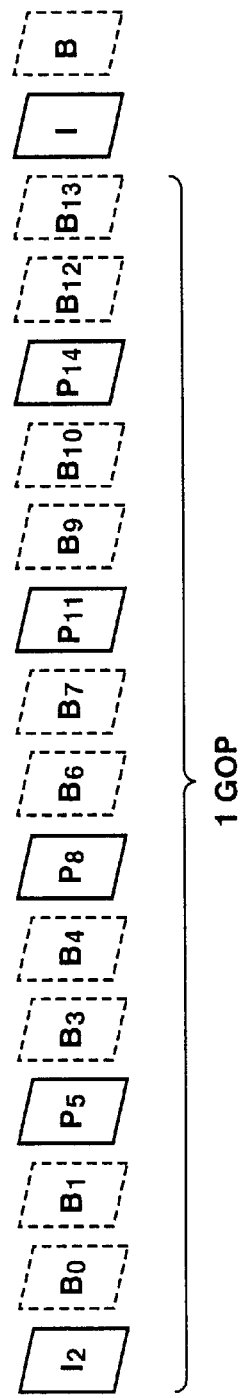

Next, FIG. 6 shows a specific example of the aforementioned first fast reproduction mode and FIG. 7 shows a specific example of the aforementioned second fast reproduction mode. In these specific examples of FIG. 6 and FIG. 7, as has been explained with FIG. 2, a video data in the minimum reproduction unit VOBU (video object unit) corresponds to one GOP and it is assumed that the GOP is constituted by one frame of I picture, four frames of P picture and ten frames of B picture, and one VOBU contains five reference pictures (I picture and P picture).

FIG. 6 explains the first fast reproduction mode in whch all the video data within the minimum reproduction unit VOBU are read for reproducing and displaying all the five reference pictures (I picture $I_2$ and P pictures $P_5$, $P_8$, $P_{11}$, $P_{14}$). From the recording medium 1 of FIG. 4, a compressed video data of the area $R_{PB}$ corresponding to all the video data in the VOBU shown in FIG. 6A is supplied via the pickup 2, the RF circuit 3, and the data decoder 4 to the demultiplexer 5. From the compressed video data, a compressed video data of the reference pictures of I picture $I_2$ and the P pictures $P_5$, $P_8$, $P_{11}$, $P_{14}$ is fed to the video encoder 6 so as to be encoded.

Accordingly, during a forward fast reproduction (FF), as shown in FIG. 6B, the pictures are reproduced to be displayed in the order of $I_2$, $P_5$, $P_8$, $P_{11}$, $P_{14}$, $I_2$, $P_5$, $P_8$. During a backward fast reproduction (FR), as shown in FIG. 6C, the pictures are reproduced to be dispalyed in the order of $P_{14}$, $P_{11}$, $P_8$, $P_5$, $I_2$, $P_{14}$, $P_{11}$, $P_8$.

In this first fast reproduction omde, all the reference pictures (I picture and P picture) are reproduced to be displayed and accordingly, the motion looks very smooth. However, since all the compressed video data are read out from the recording medium, the picture coding amount is very large, disabling to obtain a safficient supply speed if at a high bit rate. There is also a case that the target speed (for example, double speed) cannot be obtained.

FIG. 7 shows an example of the second fast reproduction mode in which some of the reference pictures within the minimum reproduction unit VOBU, i.e., three reference pictures ($I_2$, $P_5$, $P_8$) are reproduced and displayed. That is, a data is supplied from the address of the VOBU to be reproduced on the recording medium 1 of FIG. 4 via the pickup 2, the RF crcuit 3, the data decoder 4 to the demultiplexer 5. However, in the data decoder 4, from DSI (data search information) of the control information pack NV_PCK, it is possible to obtain the end address containing the video pack (V_PCK) equivalent to the aforementioed three reference pictures (I picture and P picture), i.e., the address of the third reference picture (VOBU_3RDREF_EA). Accordingly, as shown in FIG. 7A, only a compressed video data of the region RPB corresponding to up to the third reference picture address (VOBU_3RDREF EA) is read for each VOBU so that the data is supplied via the pickup 2, the RF circuit 3, and the data decoder 4 to the demultiplexer 5. The remaining region $R_{JP}$ in the VOBU is skipped such as by track jump without being reproduced.

The controller 11 fetches the aforementioned NV_PCK. The main video compressed data (video data) of the NV_PCK and after is fed to the video decoder 6, and the controller 11 causes the video decoder 6 to perform decoding only with the aforementioned three reference pictures, i.e., I picture and P pciture.

In the case of forward fast reproduction (FF), as shown in FIG. 7B, the three reference pictures in the VOBU ($I_2$, $P_5$, $P_8$) are successively decoded and displayed so that the pictures are represented in the order of $I_2$, $P_5$, $P_8$, $I_2$, $P_5$, $P_8$.

In the case of backward fast reproduction (FR), firstly the aforementioned three refereence pictures are decoded and when a main video compressed data of the next VOBU is supplied to the video decoder 6, the pictures are represented in the reverse order to the decoding order. That is, as shown in FIG. 7C, pictures are represented in the order of $P_8$, $P_5$, $I_2$, $P_8$, $P_5$, $I_2$.

Thus, in the second fast reproduction mode, the region $R_{JP}$ is skipped by track jump or the like. Accordingly, even if the recording information bit rate is high, it is possible to obtain a stable reproduction speed to a certain degree. However, two (pictures $P_{11}$, $P_{14}$) of the five reference pictrues in the VOBU are not represented and accordingly, the motion smoothness may not be obtained.

The switchig between the first and the second reproduction modes is controlled so that when the speed determined is higher than the threshold value, the first fast reproduction mode is set in for representing a greater number of reference pictures. That is, when the reproduction speed determined is high, it means that there is a sufficient capacity for reproduction processing. Accordingly, the first fast reproduction mode is set in for a smooth motion and a high-quality fast reproduction. When a rapid motion or a complicated image increases the data amount per picture, there is no time for reading all the data from the medium, lowering the reproduction speed. If the reproduction speed determined becomes lower than the threshold value, in order to obtain the target fast reproduction speed (for example, double speed), the second fast reproduction mode is set in requiring a smaller number of reference pictures. It should be noted that by using two threshold values Va, Vb for the mode switching, it is possible to prevent an unstable operation such as chattering upon switching.

Next, explanation will be given on a specific example of the aforementioned reproduction speed detection.

Figure 1:
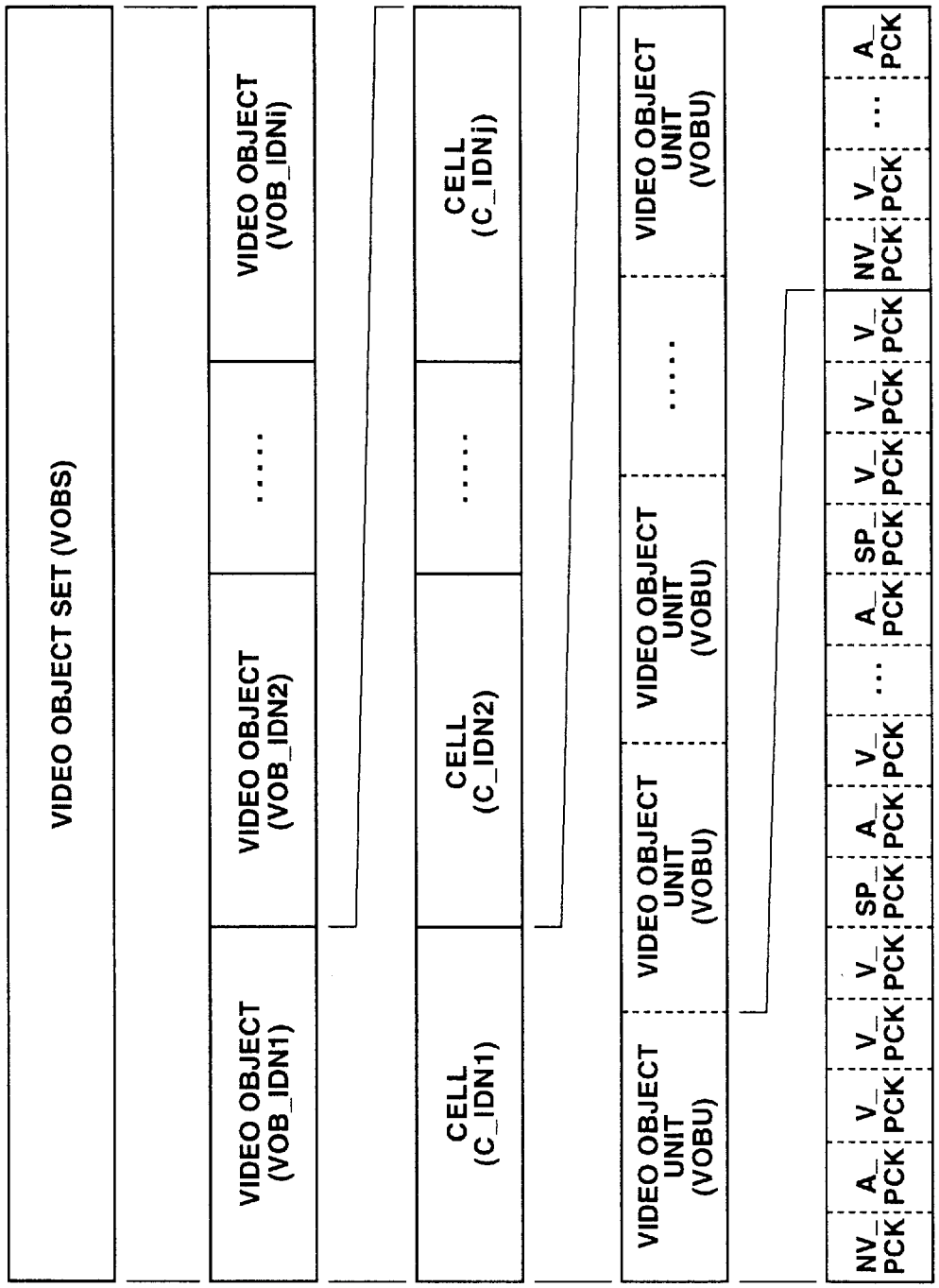
FIG. 1 shows a data configuration of the DVD (digital video disc) format.

For example, a reproduction speed is obtained as follows. From the navigation pack NV_PCK in the VOBU shown in FIG. 1, the VOBU presentation start time VOBU_S_PTM and the presentation end time VOBU_E_PTM are read in, so as to determine their difference (VOBU_E_PTM−VOBU_S_PTM) to obtain a representation time, which is devided by the time t from the moment of the decoding the VPBU starting picture to the moment of decoding of the next VOBU starting-picture. Thus, a reproduction veclocity v is obtained.

$$v=((\text{VOBU\_E\_PTM}-\text{VOBU\_S\_PTM})/90000)/t$$

Figure 3:
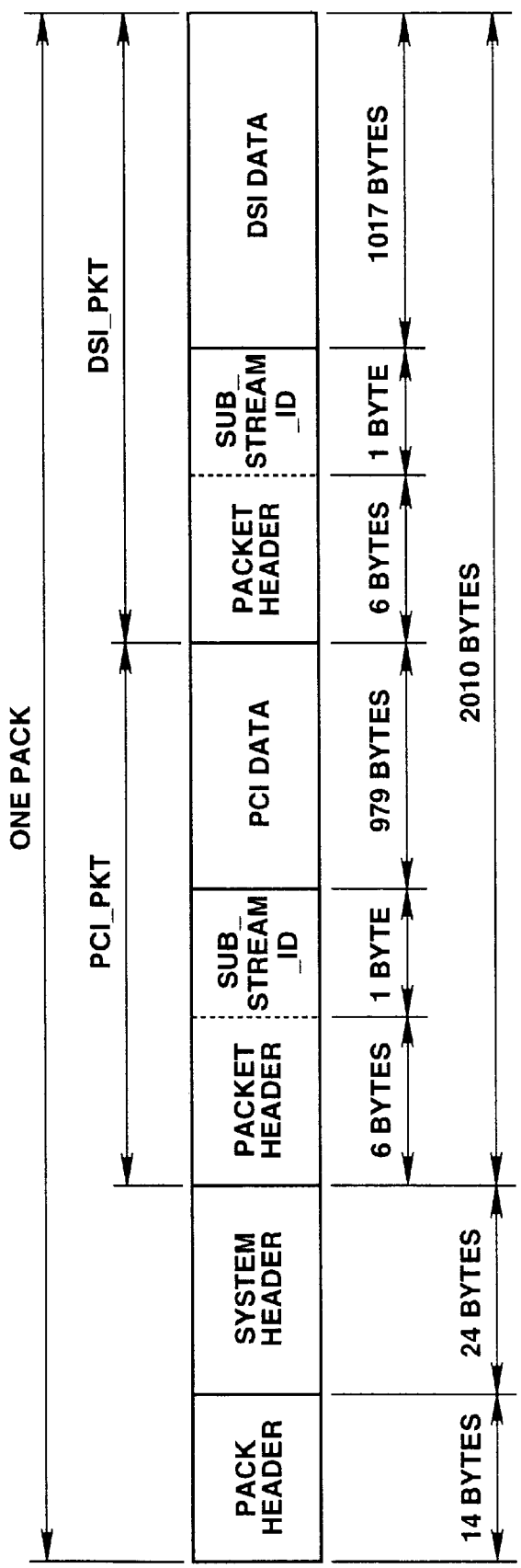
FIG. 3 shows a configuration of the navigation pack (NV-PCK).

In this equation, 90000 is a coefficient used for expressing the value of VOBU_E_PTM and VOBU_S_PTM in the unit of second. The unit of t is also the second. Moreover, the VOBU_E_PTM and VOBU_S_PTM are written as a part of the PCI data in the PCI packet (PCI_PKT) in the navigation pack NV_PCK shown in FIG. 3.

Moreover, instead of the aforementioned reproduction speed, it is also possible to use a bit rate.

This bit rate is calcualated as follows:

(VOBU information amout)/(VOBU reproduction time). The VOBU information amount, for example, can be obtained by using the VOBU end address VOBU_EA written as a part of the DSI data in the DSI packet DSI_PKT in the navigation pack NV_PCK shown in FIG. 3. This VOBU_EA indicates a relative sector address from the head. Accordingly, by using the sector size (=2048 bytes), it is possible to obtain the entire VOBU size (number of bytes). Moreover, the reproduction time can be obtained by using (VOBU_E_PTM−VOBU_S_PTM)/90000 as the same manner described above.

Thus, when a bit rate is determined as the reproduction state, a predetermined threshold vaule is set and if the bit rate determined is lower than the threshold value, the first fast reproduction mode is set for reproducing a greater number of reference pictures. When a recorded information amount is small and a sufficient capacity is available for reproduction processing, all the reference pictures can be decoded and the reproduction is performed in the first fast reproduction mode with a smooth motion. On the contrary, when the bit rate determined is higher than the threshold value, considering that no sufficient time is avaiable for reproduction processing, the mode is switched to the second fast reproduction mode requiring a smaller number of reference picdtures, so that the reproduction processing can be perforemed in time for the target sepeed (for example, double speed). It should be noted that in this case also, in the same way as the aforementioned switching operation, it is possible to set two threshold values for providing hysterisis in the switching operation.

In the controller 11 of FIG. 4 that performs the fast reproduction mode switching control according to the speed or bit rate determined, the detector block 11a detects the speed or bit rate according to the navigation pack NV_PCK information from the demultiplexer 5 and the decode information from the video decoder, and supplies the detection output to the decision block 11b, where the detection output is compared to a predetermined threshold value to identify an optimal fast reproduction mode. According to the decision result, the mode switching block 11c controls to switch operation of the reproduction mechanism including the data decoder 4 and the RF circuit 3 for switching the fast reproduction modes.

On the other hand, the first and the second fast reproduction mode are not to be limited to a mode for using all of the five reference pictures or three of the five reference pictures int he VOBU. For example, the second fast reproduction-mode may use two or one of the reference pictures. Moreover, it is also possible to reproduce and display thee reference pictures in the first fast reproduction mode and two or one reference picture in the second fast reproducdtion mode. This is advantageous when performing a faster reproduction (for example, three times faster than the normal speed).

In general, when the coded video signal is recorded on the recording medium with a variable bit rate, control is performed to switch to a mode using a greater number of reference pictures as the speed detected increases, or as the bit rate detected decreases. That is, when the speed detected is high, or the reproduction bit rate is low, i.e., when there is a sufficiet capacity for reproduction processing, a fast reproduction mode using a greater number of reference pictures is selected to enable a fast reproduction display with a smooth motion. When the reproduction speed detected is slow or the reproduction bit rate is high, i.e., when there is no sufficient time for reproduction processing, a fast reproudction mode requiring a smaller number of reference pictures is selected so as to increase the reproduction speed or to maintain the target reproduction speed.

It should be noted that the present invention is not to be limited to the aforementioned embodiment. The present invention can be modified in various ways without departing from the concept and scope of the present invention.

As is clear from the aforementioned, according to the present invention, when performing a fast reproduction of a video signal which has been prediction coded in the time axis direction and recorded on a recording medium, it is possible to switch between different numbers of reference pictures from the video signal recorded on the recording medium, thus enabling to obtain an optimal fast reproduction mode according to the reproduction state and to perform a high-speed representation with a smooth motion.

Here, the aforementioned switching may be controlled by determining a reproducion state such as a reproduction speed and a reproduction bit rate and comparing the obtained value with a threshold value so as to identify an appropriate fast reproduction mode. More specifically, when the coded video signal has been recorded with a variable rate on the recording medium, as the speed determined becomes higher, a fast reproduction mode requiring reproduction of a greater number of reference pictures is selected. Alternatively, as the bit rate determined becomes lower, a fast reproduction mode requiring reproduction of a greater number of reference pictures is selected.

Thus when the reproduction speed determined is high or the reproduction bit rte determined is low, i.e., when there is a sufficient reproduction capacity, a fast reproduction mode requiring reproduction of a greater number of reference pictures is selected, thus enaling to obtain a fast reproducion and representation with a mooth motion.

What is claimed is:

1. A video signal reproduction apparatus for performing a reproduction processing by reading a video signal which has been prediction coded in the time axis direction and recorded on a recording medium, said apparatus comprising:

a control block for switching, during a fast reproduction, according to a reproduction state, between a plurality of fast reproduction modes requiring reproduction of different numbers of reference pictures from said video signal recorded on said recording medium, wherein said plurality of fast reproduction modes includes a first fast reproduction mode having a first threshold value and a second fast reproduction mode having a second threshold value, and said first threshold value is lower than said second threshold value, and wherein said control block detects a reproduction speed of said recording medium and compares said detected reproduction speed with at least one of said first threshold value and said second threshold value.

2. A video signal reproduction apparatus as claimed in claim 1, wherein said control block comprises:

detection means for detecting a reproduction state;

decision means for comparing a detection output from said detection means with a threshold value so as to identify an appropriate fast reproduction mode; and switching means for switching between said plurality of fast reproduction modes according to a decision result from said decision means.

3. A video signal reproduction apparatus as claimed in claim 2, wherein said detection means is a speed detection means for detecting a reproduction speed of said recording medium, and said decision means decides to select a fast reproduction mode requiring reproduction of a greater number of reference pictures as a higher speed is detected by said detection means.

4. A video signal reproduction apparatus as claimed in claim 1, wherein said plurality of fast reproduction modes are realized by a first fast reproduction mode using all the reference pictures in the video signal recorded on said recording medium and a second fast reproduction mode using some of the reference pictures.

5. A video signal reproduction apparatus as claimed in claim 4, wherein said video signal has been prediction coded in the time axis direction in blocks of a minimum reproduction unit containing five reference pictures and recorded on said recording medium, and said second fast reproduction mode uses first three reference pictures within said minimum production unit.

6. A video signal reproduction apparatus as claimed in claim 1, wherein said video signal has been prediction coded in the time axis direction in blocks of a minimum reproduction unit containing five reference pictures and recorded on said recording medium, and said plurality of fast reproduction modes are at least two fast reproduction modes requiring reproduction of different numbers of reference pictures, five, four, three, two, or one per said minimum reproduction unit.

7. A video signal reproduction apparatus as claimed in claim 1, wherein:

said control block, while in said first fast reproduction mode, switches from said first fast reproduction mode to said second fast reproduction mode when said detected reproduction speed is less than or equal to said first threshold value, and said control block, while in said second fast reproduction mode, switches from said second fast reproduction mode to said first fast reproduction mode when said detected reproduction speed is greater than or equal to said second threshold value.

8. A video signal reproduction method for performing a reproduction processing by reading a video signal which has been prediction coded in the time axis direction and recorded on a recording medium, said method comprising a step of controlling to switch, during a fast reproduction, according to a reproduction state, between a plurality of fast reproduction modes requiring reproduction of different numbers of reference pictures from said video signal recorded on said recording medium, wherein said plurality of fast reproduction modes includes a first fast reproduction mode having a first threshold value and a second fast reproduction mode having a second threshold value, and said first threshold value is lower than said second threshold value, and wherein said controlling step includes detecting a reproduction speed of said recording medium and comparing said detected reproduction speed with at least one of said first threshold value and said second threshold value.

9. A video signal reproduction method as claimed in claim 8, wherein said controlling step comprises:

a detection step for detecting a reproduction state;

a decision step for comparing a detection output from said detection step with a threshold value so as to identify an appropriate fast reproduction mode; and a switching step for switching between said plurality of fast reproduction modes according to a decision result from said decision step.

10. A video signal reproduction method as claimed in claim 9, wherein said detection step is a speed detection step for detecting a reproduction speed of said recording medium, and said decision step decides to select a fast reproduction mode requiring reproduction of a greater number of reference pictures as a higher speed is detected.

11. A video signal reproduction method as claimed in claim 8, wherein said controlling step includes:

while in said first fast reproduction mode, switching from said first fast reproduction mode to said second fast reproduction mode when said detected reproduction speed is less than or equal to said first threshold value, and while in said second fast reproduction mode, switching from said second fast reproduction mode to said first fast reproduction mode when said detected reproduction speed is greater than or equal to said second threshold value.

12. A video signal reproduction apparatus for performing a reproduction processing by reading a video signal which has been prediction coded in the time axis direction and recorded on a recording medium, said apparatus comprising:

a control block for switching, during a fast reproduction, according to a reproduction state, between a plurality of fast reproduction modes requiring reproduction of different numbers of reference pictures from said video signal recorded on said recording medium, wherein said plurality of fast reproduction modes includes a first fast reproduction mode having a first threshold value and a second fast reproduction mode having a second threshold value, and said first threshold value is lower than said second threshold value, and wherein said control block detects a bit rate of information reproduced from said recording medium and compares said detected bit rate with at least one of said first threshold value and said second threshold value.

13. A video signal reproduction apparatus as claimed in claim 12, wherein said control block comprises:

detection means for detecting a reproduction state;

decision means for comparing a detection output from said detection means with a threshold value so as to identify an appropriate fast reproduction mode; and switching means for switching between said plurality of fast reproduction modes according to a decision result from said decision means;

wherein said detection means is a bit rate detection means for detecting a bit rate of information reproduced from said recording medium, and said decision means decides to select a fast reproduction mode requiring reproduction of a greater number of reference pictures as a lower bit rate is detected by said detection means.

14. A video signal reproduction apparatus as claimed in claim 12, wherein:

said control block, while in said first fast reproduction mode, switches from said first fast reproduction mode to said second fast reproduction mode when said detected bit rate is greater than or equal to said first threshold value, and said control block, while in said second fast reproduction mode, switches from said second fast reproduction mode to said first fast reproduction mode when said detected bit rate is less than or equal to said second threshold value.

15. A video signal reproduction method for performing a reproduction processing by reading a video signal which has been prediction coded in the time axis direction and recorded on a recording medium, said method comprising a step of controlling to switch, during a fast reproduction, according to a reproduction state, between a plurality of fast reproduction modes requiring reproduction of different numbers of reference pictures from said video signal recorded on said recording medium, wherein said plurality of fast reproduction modes includes a first fast reproduction mode having a first threshold value and a second fast reproduction mode having a second threshold value, and said first threshold value is lower than said second threshold value, wherein said controlling step includes detecting a bit rate of information reproduced from said recording medium and comparing said detected bit rate with at least one of said first threshold value and said second threshold value.

16. A video signal reproduction method as claimed in claim 15, wherein said controlling step comprises:

a detection step for detecting a reproduction state;

a decision step for comparing a detection output from said detection step with a threshold value so as to identify an appropriate fast reproduction mode; and a switching step for switching between said plurality of fast reproduction modes according to a decision result from said decision step;

wherein said detection step detects a bit rate of information reproduced from said recording medium, and said decision step decides to select a fast reproduction mode requiring reproduction of a smaller number of reference pictures as a higher bit rate is detected by said detection step.

17. A video signal reproduction method as claimed in claim 15, wherein said controlling step includes:

while in said first fast reproduction mode, switching from said first fast reproduction mode to said second fast reproduction mode when said detected bit rate is greater than or equal to said first threshold value, and while in said second fast reproduction mode, switching from said second fast reproduction mode to said first fast reproduction mode when said detected bit rate is less than or equal to said second threshold value.

* * * * *